Patented Dec. 13, 1938

2,140,381

UNITED STATES PATENT OFFICE 2,140,381

METHOD OF PRODUCING LEAD GLAZES

Hermann Harkort, Berlin-Tegel, Germany, assignor to Hans-Joachim Harkort, Zurich, Switzerland No Drawing. Application April 10, 1933, Serial No. 665,395. In Germany April 25, 1932

6 Claims. (Cl. 106—36.2)

This invention relates to a method of producing lead glazes.

Into the batches of lead glazes used to a large extent in ceramics, particularly in the earthenware industry and in pottery, as easy-flowing glazings lead is usually introduced in the form of litharge or minium, and sometimes also in the form of white lead, a lead oxide preparation containing a considerable amount of basic lead carbonate.

It has been proposed already to employ for the same purpose lead ores, especially galena, but this way of introducing lead into the batch has not given satisfaction, since substances like galena or the like have to be oxidized first by burning whereby sulfates are produced which will dull the glaze unless they are destroyed by bothersome firing and burning at high temperatures. The high temperatures required for this purpose will render illusory, however, the purpose for which lead is introduced into the glazes and which consists mainly in lowering the melting point.

It was therefore necessary hitherto to depend for this purpose on the lead preparations mentioned above which, however, are very expensive owing to the fact that the manufacture and distribution thereof is exclusively carried on by syndicates. Furthermore, the use of these materials is rendered still more expensive by the necessity of homogenizing in a complicated way the usual commercial products produced and intended for purposes differing completely from those described and of bringing them to a certain degree of fineness prior to introducing them into the batch.

Minium, for instance, of which the most extensive use is made in this connection costs at present, in round figures, fifty Reichsmarks per 100 kilos, and when it is taken into consideration that with respect to weight the share of lead-containing constituents of the batch is extraordinarily great, it will be seen that such a price must considerably increase the cost of glaze and thus that of production in all branches of the ceramic industry, which employ lead glazes.

The same applies also to litharge which, though small amounts thereof are obtained as a sort of by-product during the assaying of silver, is, as a rule, artificially and specially made for the industrial purposes for which it is used.

As an example, a batch for a colorless lead glaze is specified below, and the constituents are given by weight for the sake of greater clearness:

| | Kilos |
|---|---|
| Calcined soda | 22.6 |
| Marble, chalk or calc-spar | 5 |
| Litharge or minium | 165 |
| Sand | 110 |

This typical lead glaze batch discloses clearly the considerable part by weight of the litharge or minium to be added.

According to the invention, the cost of producing such glazes can be essentially reduced by employing as carrier of the lead to be introduced into the batch cheap materials generally considered as waste products hitherto instead of the expensive commercial lead compounds which have been regarded as the only suitable ones till now. The possibility of using such waste products as part of glaze batches could not be expected, since a general strong prejudice existed concerning the employment for such purposes of all materials whose composition was not fixed once for all.

It is most astonishing, however, that this possibility has been found to exist under certain conditions and that industrial waste products of various kinds consisting chiefly of lead oxides or metallic lead in finest distribution may be used with excellent success to serve as carriers for the introduction of lead into glaze batches in lieu of expensive artificially made substances.

It has further been found that the lead-containing waste products of the accumulator industry or the products corresponding thereto and obtained during the operation of accumulators are particularly suited for this purpose. This applies, above all, to products known as lead dross, and lead smear or paste consisting of a mixture of lead oxides of different degrees of oxidation, small amounts of metallic lead and various impurities. These products are considered practically worthless at present by the accumulator factories where they are obtained and can therefore be had at low prices which are naturally out of proportion to those asked for the lead compounds hitherto employed.

Lead dross and lead smear are waste products forming during the manufacture of accumulator plates.

Another material excellently suitable for the same purpose is the lead dust also used at present in the manufacture of accumulator plates in connection with various lead oxides, the dust being obtained as pure or more or less oxidized metal powder during the grinding of lead in ball or drum mills. When oxidized to a certain degree, this powder is not suitable any more for the purposes of the accumulator industry, whereas the method according to the invention can profitably utilize pure, but preferably fully or partly oxidized, lead dust, though of course lead dust not obtained as waste prduct but especially made and prepared by grinding for the purpose according to the invention may be used also.

The employment of the materials intended by the invention to serve as carriers for the lead of the glaze batch does not complicate the working process in any way, it being merely necessary to ascertain the lead content of the lots of waste products supplied and then to compute the quantity thereof to be introduced into the glaze batch while making allowance for the impurities. As a matter of fact, it will be found that fluctuations in the composition of the waste products are very slight.

By suitable arrangements, the accumulator factories or the like producing these materials may provide for the mixture of the substances obtained at different degrees of oxidation on the spot in such a way that the lead content of the total mixture corresponds to that of minium and it will be possible therefore to replace the weights of minium contained in the glaze batches usually employed in ceramic works by the same amounts of weight of corresponding waste product mixtures.

A mixture of this kind may consist either exclusively of lead slime, lead dross and lead paste or one or the other of these materials, or of lead dust in pure though preferably fully or partly oxidized form with or without the addition of one or the other of the above-mentioned materials. In addition, a certain percentage of artificially produced lead oxides, such as litharge or minium, may be used when necessary, e. g., if the available quantities of waste products or lead dust do not suffice.

In order to insure by all means the conversion of the metallic lead contained in the mixture into lead silicate, it is advisable, especially in the manufacture of earthenware, to oxidize the metallic lead before the burning, that is, during fritting. If the waste, as it often does, contains a certain amount of lead superoxide ($PbO_2$), this can be effected by the oxidizing action of this material or, if this is not the case, by the addition of another suitable oxidizing agent, especially of an alkali nitrate.

Where glazings of the type used in the tile stove industry are concerned, i. e., glazings which are not fritted before, oxidation of the metallic lead contained in the waste products takes place in a very simple manner by the contact, during baking, of a thin layer of the glazing and the oxygen of the gases of combustion, in which case all that is necessary is, therefore, to make provision for oxidizing baking.

The method according to the invention insures a considerable cheapening of the lead glazes employed in the ceramic industry and, further, provides a new use of waste proucts hitherto considered almost worthless, so that the invention constitutes a considerable technical and economic advance in the branch of industry concerned.

I claim:—

1. A method of producing lead containing glazes consisting in fine-grinding metallic lead under the admission of air thereby producing a mixture consisting only of the lead in various degrees of oxidation within the range from metallic lead to lead superoxide, mixing this mixture with the other constituents usual in lead glazes and melting the mixture.

2. A modification of the method according to claim 1 the initial material to be ground being already at least partially oxidized.

3. A method according to claim 1 which consists in oxidizing the lead during grinding in such a degree that the lead content of the oxidized product is approximately the same as the lead content of the same quantity of minium.

4. A method of producing lead containing glazes consisting in fine-grinding material consisting only of lead which is partially oxidized, admitting air to the material during grinding and producing a mixture consisting only of lead oxidized to various degrees averaging substantially the oxygen lead proportion of minium, mixing this material with other constituents usual in lead glazes and melting the mixture.

5. A method of producing lead containing glazes consisting in fine-grinding metallic lead under the admission of air thereby producing a mixture consisting only of lead in various degrees of oxidation within the range from metallic lead to lead superoxide, mixing this mixture with the other constituents usual in lead glazes, fritting the mixture under oxidizing conditions and thereby oxidizing the portions of the lead having lesser degrees of oxidation.

6. The method of producing lead containing glaze which consists in fine-grinding in an oxidizing atmosphere waste lead from storage battery material, controlling the grinding and admission of air to produce lead in various degrees of oxidation from metallic lead to lead superoxide, mixing the ground lead with the other constituents usual in lead glazes, and melting the mixture.

HERMANN HARKORT.